US012556640B2

(12) United States Patent
Kim et al.

(10) Patent No.: US 12,556,640 B2
(45) Date of Patent: Feb. 17, 2026

(54) SCANNING TECHNIQUE ADJUSTABLE PER PAGE

(71) Applicant: Hewlett-Packard Development Company, L.P., Spring, TX (US)

(72) Inventors: Kihun Kim, Seongnam Si (KR); Heesang Kwon, Seongnam Si (KR); Jaeyeon Kim, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 112 days.

(21) Appl. No.: 18/564,810

(22) PCT Filed: Nov. 10, 2021

(86) PCT No.: PCT/US2021/058702
§ 371 (c)(1),
(2) Date: Nov. 28, 2023

(87) PCT Pub. No.: WO2022/256035
PCT Pub. Date: Dec. 8, 2022

(65) Prior Publication Data
US 2025/0088599 A1    Mar. 13, 2025

(30) Foreign Application Priority Data

May 31, 2021    (KR) ......................... 10-2021-0070064

(51) Int. Cl.
*H04N 1/04* (2006.01)
*H04N 1/00* (2006.01)

(52) U.S. Cl.
CPC ........... *H04N 1/042* (2013.01); *H04N 1/0044* (2013.01); *H04N 1/00474* (2013.01); *H04N 1/00482* (2013.01); *H04N 1/00811* (2013.01)

(58) Field of Classification Search
CPC .. H04N 1/042; H04N 1/0044; H04N 1/00474; H04N 1/00482; H04N 1/00811
See application file for complete search history.

(56) References Cited

U.S. PATENT DOCUMENTS 11,765,288 B1 *  9/2023  Antony Muthu Rayar ................. H04N 1/40 358/474
2009/0051981 A1 *  2/2009  Kuboki .............. H04N 1/00432 358/474

(Continued)

FOREIGN PATENT DOCUMENTS

EP    0409154 A2    1/1991
JP    3951862 B2    8/2007

(Continued)

*Primary Examiner* — Nicholas Pachol
(74) *Attorney, Agent, or Firm* — Foley & Lardner LLP

(57) ABSTRACT

An example non-transitory computer readable storage medium has stored therein a computer program that, based on execution by a computer, causes the computer to perform operations including generating first image data by scanning a document including a first page and a second page, providing a first scan option applicable to the first page along with first page size information corresponding to the first scan option and a second scan option applicable to the second page along with second page size information corresponding to the second scan option, and generating second image data by performing image processing based on the first scan option and the second scan option being respectively selected for the first page and the second page.

19 Claims, 9 Drawing Sheets

(56) References Cited

U.S. PATENT DOCUMENTS

| | | | |
|---|---|---|---|
| 2010/0073738 A1 | 3/2010 | Chi | |
| 2012/0212787 A1* | 8/2012 | Hasegawa | H04N 1/33315 |
| | | | 358/447 |
| 2013/0335792 A1* | 12/2013 | Poysa | H04N 1/00912 |
| | | | 358/406 |
| 2013/0335793 A1* | 12/2013 | Poysa | H04N 1/48 |
| | | | 358/402 |
| 2014/0139891 A1 | 5/2014 | Byun | |
| 2015/0277321 A1 | 10/2015 | Nonaka | |
| 2015/0288840 A1* | 10/2015 | Ge | H04N 1/00856 |
| | | | 358/1.14 |
| 2016/0366289 A1* | 12/2016 | Kitamura | G06F 3/1292 |
| 2017/0064141 A1* | 3/2017 | Tsutsumi | G06V 20/62 |
| 2020/0028987 A1* | 1/2020 | Gopalakrishnan | G06V 30/414 |
| 2020/0076972 A1* | 3/2020 | Machida | H04N 1/00424 |
| 2021/0289084 A1* | 9/2021 | Li | H04N 1/042 |

FOREIGN PATENT DOCUMENTS

| | | |
|---|---|---|
| JP | 2011-135420 A | 7/2011 |
| KR | 10-2006-0133232 A | 12/2006 |
| KR | 10-2169992 B1 | 10/2020 |

* cited by examiner

SCANNING TECHNIQUE ADJUSTABLE PER PAGE

BACKGROUND

There exist different types of image forming apparatuses, including dedicated printers, scanners, copiers, facsimile machines, etc., and also multi-function products (MFPs) that act as an all-in-one solution to provide a combination of, e.g., printing, copying, scanning, and faxing functions.

In this regard, an image forming apparatus may scan a document or the like to generate scanned image data in a file format. The generated file may be stored in the image forming apparatus or another type of storage device, or transferred by e-mail, fax, or some other form of network communication.

BRIEF DESCRIPTION OF THE DRAWINGS

Various examples will be described below by referring to the following figures.

DETAILED DESCRIPTION

Figure 1:
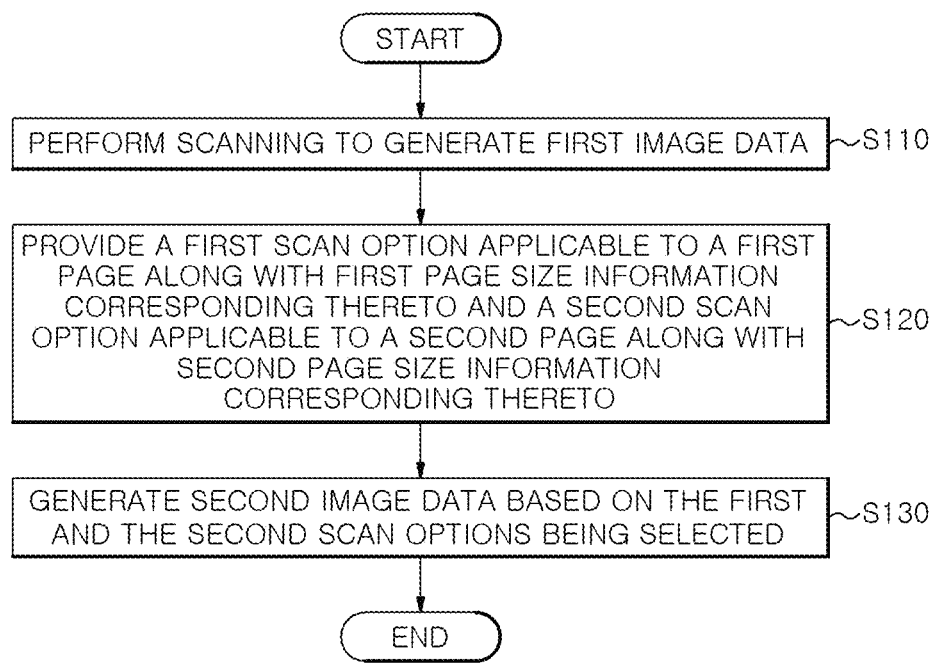
FIG. 1 is a flow diagram illustrating a scanning method according to an example.

An example image forming apparatus may provide a scan-related function of scanning a document to obtain image data. The image forming apparatus may store the image data as a file in the image forming apparatus or another electronic device or transfer the file by e-mail, fax, or some other form of network communication.

In carrying out the scanning of the document, a user may select a scan option of the image forming apparatus. By way of example, the scan option may include a format of a file to be stored, such as BMP, JPG, JPEG, TIFF, PDF, or the like, an image quality, such as Low, Mid, High, or the like, a color/monochrome mode, such as Mono, Gray, Color, or the like, a resolution, such as 200 dpi, 300 dpi, 600 dpi, or the like, a page type, such as text, picture, text-with-picture, or the like, a page orientation, such as landscape, portrait, or the like, or other options. The user may apply the scan option, as set as desired or as set by default in the image forming apparatus, for the scanning of the document.

The image data obtained by scanning may have a file size that depends on the scan option. In various examples, the file size of the image data may be larger based on the scanning being performed with a high resolution than with a low resolution, in a color mode than in a monochrome mode, in a less compressed file format than in a highly compressed file format, and the like. The user may adjust the scan option in order to adjust the file size of the image data regarding the scanned document.

In general, there may be a tradeoff between the image quality and the file size of the image data. For example, as the user desires to reduce the file size of the generated image data, he/she may make an adjustment to the scan option, e.g., from a 600 dpi resolution to a 300 dpi resolution, from a color scan mode to a monochrome scan mode, etc., and scan the document with the adjusted scan option, although the overall quality of the scanning of the document may be changed, e.g., degraded, accordingly. In this way, the user might have difficulty in reaching both goals of a reduction of the file size and an increase in the quality of the image data beyond their trade-off relationship.

The scan option may be applied per scan job. For example, given a multi-page document, a single scan job applies the same scan option to scan each page of the document. In this case, in order to apply a different scan option to different pages of the document, the user would need to perform multiple scan jobs. For example, the user would need to perform a job of scanning some pages of the document with a first scan option and a job of scanning other pages with a second scan option, followed by an edit job of merging their respective resulting sets of scanned image data.

In such case, it could be burdensome or even infeasible for the user to apply an adjusted scan option to lower the size of the entire file of the scanned document while applying a different scan option to some pages of the document to deliver a high quality of scanning of these pages.

In various examples of the present disclosure, techniques are discussed for achieving both a desired file size and a desired quality of image data regarding a scanned document, thereby improving a user experience in the scanning.

Certain examples described herein provide for application of a per-page scan option with its corresponding page size information made available as well.

Various terms used in the present disclosure are chosen from a terminology of commonly used terms in consideration of their function herein, which may be appreciated differently depending on an intended implementation, a precedent case, or an emerging new technology. In certain instances, some terms are to be construed as set forth in detail in the detailed description. Accordingly, the terms used herein are to be defined consistently with their meanings in the context of the present disclosure, rather than simply by their plain and ordinary meaning.

The terms "comprising," "including," "having." "containing." etc. are used herein to specify the presence of the elements listed thereafter. Unless otherwise indicated, these terms and variations thereof are not meant to exclude the presence or addition of other elements.

As used herein, the ordinal terms "first," "second," and so forth are meant to identify several similar elements. Unless otherwise specified, such terms are not intended to impose limitations, e.g., a particular order of these elements or of their use, but rather are used merely for referring to multiple elements separately. For instance, an element may be referred to in an example with the term "first" while the same element may be referred to in another example with a different ordinal number such as "second," "third," etc. In such examples, such ordinal terms are not to limit the scope of the present disclosure. Also, the use of the term "and/or" in a list of multiple elements is inclusive of all possible combinations of the listed items, including any one or a plurality of the items.

The term "image forming job" as used herein may encompass any of a variety of image-related jobs that involve an operation of forming an image and/or other processing operations, e.g., creation, generation, and/or transfer of an image file. The term "job" as used herein may encompass a chain of processes that facilitate an image forming job, as well as the image forming job per se. By way of example, an image forming apparatus may perform an image forming job, such as a print job, a copy job, a scan job, a facsimile or other transmission job, a storage job, a coating job, or the like.

The term "image forming device" or "image forming apparatus" as used herein may encompass any of a variety of devices, such as a printer, a copier, a scanner, a facsimile machine, a multi-function product (MFP), a display device, and the like, that is capable of performing an image forming job. In some examples, an image forming apparatus may be a two-dimensional (2D) or a three-dimensional (3D) image forming apparatus. Such image forming apparatus may provide various additional functions, as well as basic ones, for example, printing, copying, and scanning functions.

The term "user" as used herein may refer to a person who manipulates an image forming apparatus to perform an image forming job. Further, the term "administrator" as used herein may refer to a person who has access to the entire functionality of an image forming apparatus. In some examples, one person may have both roles of an administrator and user.

The terms "electronic device," "electronic apparatus," or "user device" as used herein may refer to any information processing device, such as, for example, a computer, a laptop, a personal computer (PC), a mobile telephone terminal, or the like, that may be used by a user.

The terms "scan data," "scan image," "scanned image data," "image data of a scanned document," or "scan file" as used herein may refer to any image data into which a document is scanned with an image forming apparatus.

Examples of the present disclosure will now be described with reference to the accompanying drawings. The present disclosure may, however, be embodied in many different forms and should not be construed as limited to the examples set forth herein. Rather, these examples are given in order to provide a better understanding of the scope of the present disclosure.

FIG. 1 is a flow diagram illustrating a scanning method according to an example.

Referring to FIG. 1, a document is scanned to generate first image data at operation S110. The document may include a plurality of pages. In an example, the first image data may be generated with a scan option, including, for example an option that is specified in an image forming apparatus by its user before the scanning, an option that is set by default in the image forming apparatus, an option that is input through an electronic device coupled to the image forming apparatus, or any other suitable scan option. For example, the first image data may be data, such as raw image data, that is generated by scanning the document at a maximum available specification of the image forming apparatus.

At operation S120, various options are provided. The various options may include a first scan option applicable to a first page represented by the first image data along with first page size information corresponding to the first scan option, and a second scan option applicable to a second page represented by the first image data along with second page size information corresponding to the second scan option. In an example, each of the first scan option and the second scan option may include, e.g., an image processing parameter, which is applicable for the scanning of the document. The image processing parameter may include a format of a file to be stored, an image quality, a color/monochrome mode, a resolution, a page type, a page orientation, or any other suitable image processing parameter. In an example, the page size information may include a data size, or page size, of its corresponding page, i.e., how much device storage space is used for storing that page as a file.

In an example, the first scan option applicable to a first page represented by the first image data along with the first page size information corresponding to the first scan option, and the second scan option applicable to a second page represented by the first image data along with the second page size information corresponding to the second scan option may be presented to the user on, e.g., a display of the image forming apparatus or of another electronic device, such as the user's PC or mobile device, that is coupled to the image forming apparatus.

Figure 8:
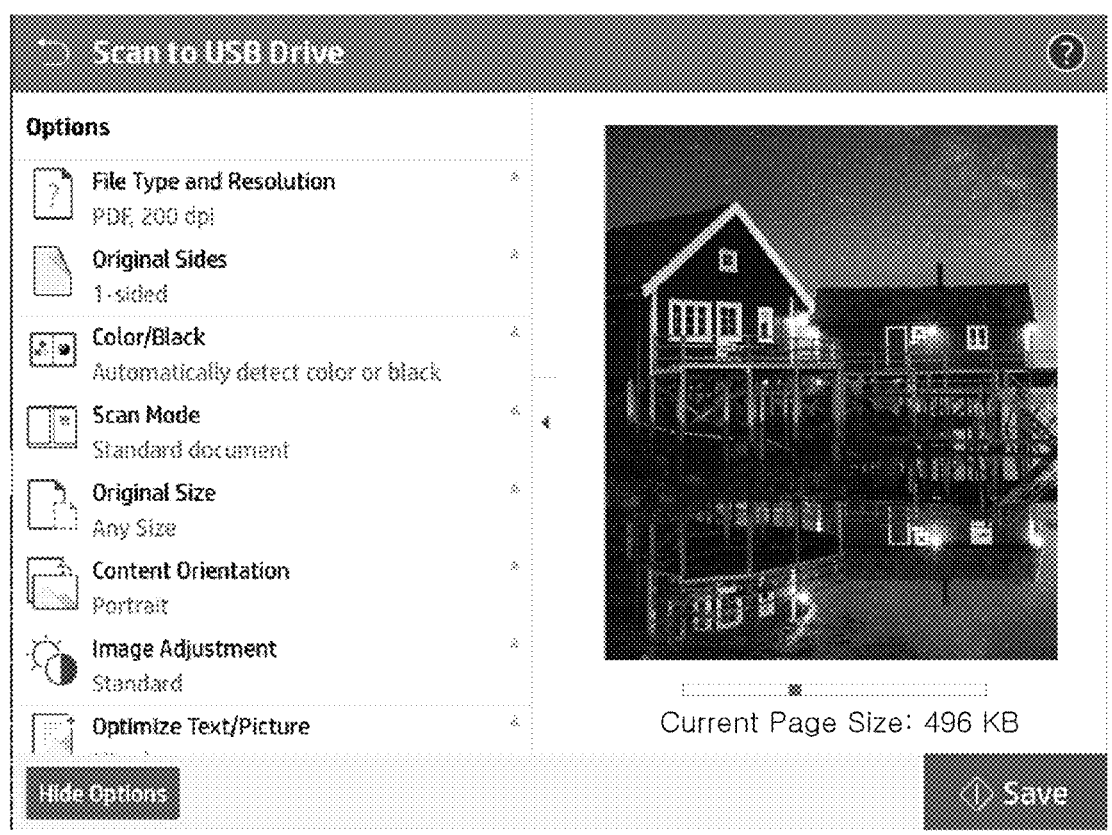
FIG. 8 depicts an interface for a page-specific adjustment to scanned image data according to an example.

FIG. 8 depicts an interface for a page-specific adjustment to scanned image data according to an example.

Referring to FIG. 8, a user may be provided with a preview picture of a page and information regarding what the page shows, what scan options are available, and a page size that the current page corresponds to based on a currently applied scan option. Further, the user may select an icon on the interface to check another page of the document. Other examples of the interface are also contemplated.

Referring again to FIG. 1, second image data is generated by performing image processing based on the first scan option and the second scan option being respectively selected for the first page and the second page at operation S130. In the illustrated example, the first and the second scan options, which are applicable to the first and the second pages of the document, respectively, may be set and thus used for image processing of the first and the second pages, respectively. At least one of the first or the second scan option may be different from the scan option applied for the generation of the first image data. Accordingly, the second image data may differ in file size from the first image data. Further, for each of the pages, a respective scan option may be selected in response to the user adjusting the page size of that page or may be determined by the user directly selecting that scan option, as will be discussed in more detail below.

Various example methods of adjusting a scan option and/or a page size option for each page of a scanned document to adjust a resulting file size for the entire document and a resulting quality of scanning of that page are presented below.

Figure 2:
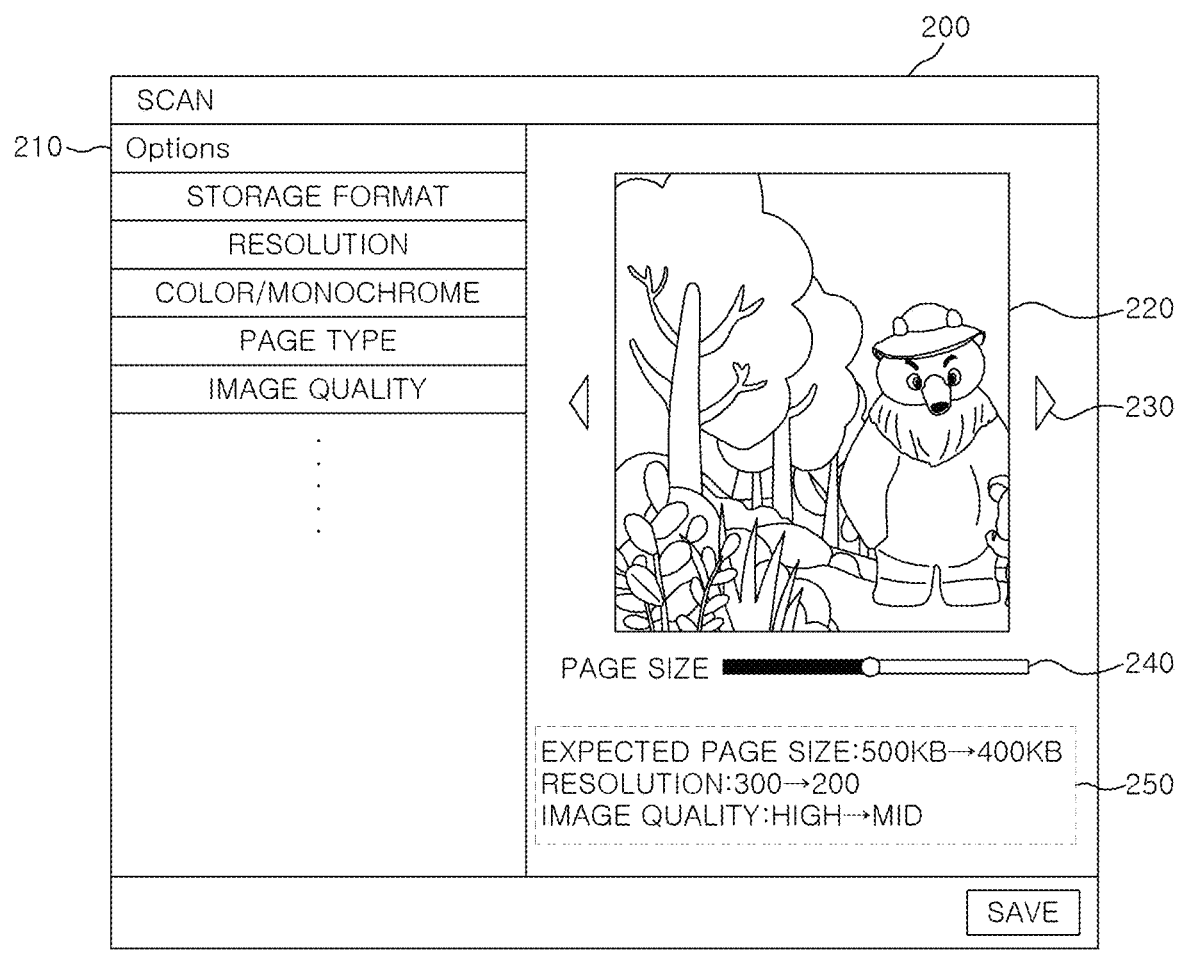
FIGS. 2 to 4 are diagrams illustrating a method for performing a page-specific adjustment to scanned image data according to various examples.
Figure 3:
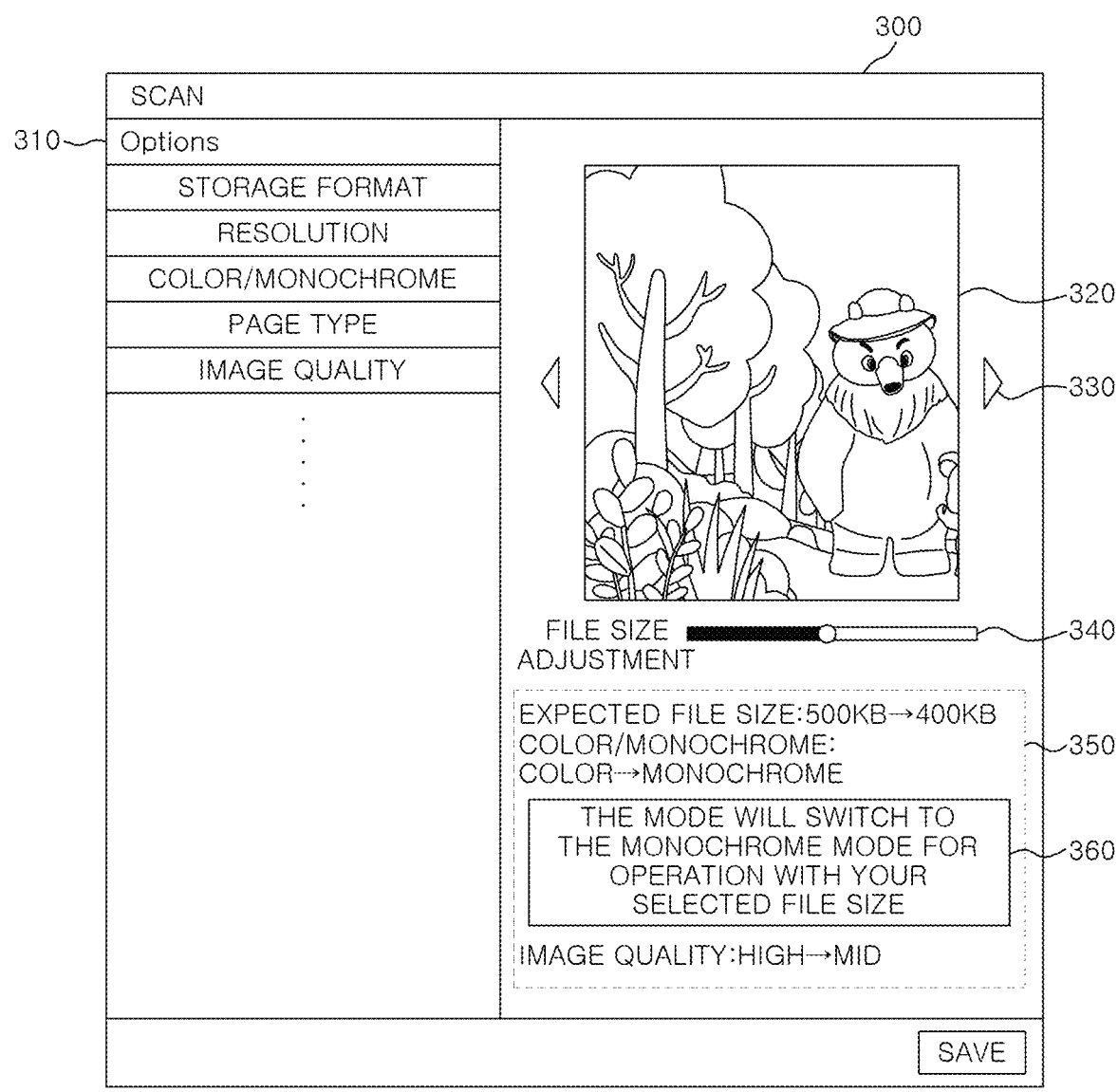
Figure 4:
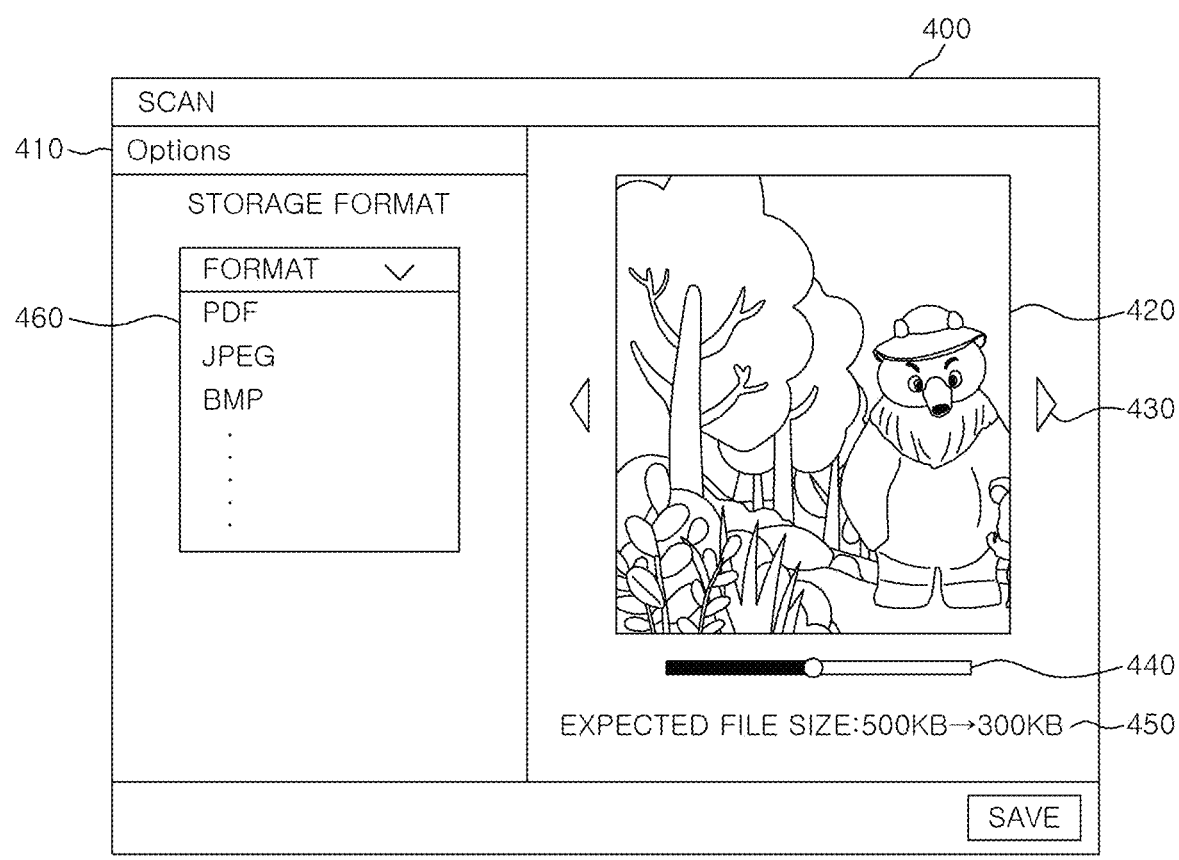

FIGS. 2 to 4 are diagrams illustrating a method for performing a page-specific adjustment to scanned image data according to various examples.

Referring to FIG. 2, an example interface 200 may be provided for a page-specific adjustment. The interface 200 may include scan options 210, a preview image 220 of a page of a scanned document, an icon 230 with which to check another page of the scanned document, a page size adjustment option 240 with which to adjust a page size of the currently presented page, and an indication 250 of, e.g., page size information regarding the current page. This interface 200 may be presented on, e.g., a display of an image forming apparatus or of another electronic device, such as a user's PC or mobile device, which is coupled to the image forming apparatus.

In the illustrated example, it is assumed that the document is multi-paged including, for example, a first page and a second page, and is scanned into first image data. The interface 200 may provide the preview image 220 of the first page as represented by the first image data, the scan options 210 applicable to the current page, and the indication 250 of the page size information regarding the current page. The user may be informed, through the interface 200, of the page size information and the currently applied scan options.

The user may change the page size of the current page. For example, the user may use the page size adjustment option 240 to change the page size. In the example of FIG. 2, the user may slide a bar to change the page size of the current page to his/her desired size. The page size adjustment option 240 may be implemented with a control element, such as an input box, a drop-down menu, or the like, as well as the above-mentioned slider bar, which can receive an input of a desired page size.

Further, for example, the page size adjustment option 240 may provide a possible range of a minimum to a maximum page size of the corresponding page. These page sizes may be determined based on, for example, supported resolutions of a scanner of the image forming apparatus, formats for file storage, possible color/monochrome modes, a given page type of the current page, degrees of image quality available, or the like.

In the illustrated example, with the first image data representing the currently scanned document, the page displayed as the preview image 220 first has a page size of 500 KB, as shown in the indication 250. The user may adjust the page size adjustment option 240 to reduce the page size of that page. The page size, as adjusted by the user manipulating the page size adjustment option 240, may be displayed, for example, in real-time, in the indication 250 of the interface 200. In this illustrated example, the user may adjust the page size from 500 KB to 400 KB.

The current page may be processed to achieve the user's selected page size in response to the user making the adjustment through the page size adjustment option 240. Such image processing may involve changes in the scan options applied to that page. In accordance with this selection made upon the page size adjustment option, the user may be prompted that some of the scan options are to be changed. In the example of FIG. 2, based on the user attempting to decrease the page size from 500 KB to 400 KB, it may be indicated that the resolution is to be changed from 300 dpi to 200 dpi, and that the image quality is to be changed from High to Mid. Other scan options 210 may also be changed. For example, the scan options 210 may include an image processing parameter including at least one of an image quality, an image resolution, an image format, a color/monochrome mode, a storage file format, and the like. By way of example, the following scan options may be changed so that the scanning of the current page may result in the change of the page size as desired by the user: a scan option with which to raise the image quality by, for example, reducing a rate of compressing the original image data to make the compression less lossy, if the page size is to be increased, a scan option with which to lower the image quality by, for example, increasing the rate of compressing the original image data while taking some loss in the compression, if the page size is to be decreased, or the like.

In addition, or as an alternative to using the page size adjustment option 240, the user may directly adjust any one of the scan options 210 to adjust the page size of each page of the targeted document. In the example of FIG. 2, there are provided several menus in which the scan options 210 are selectable. In this way, the user may select one of the scan options 210 to adjust the scan option. As illustrated, the user may adjust the storage format, the resolution, the color/monochrome mode, the page type, the image quality for the current page, etc. The interface 200 may provide information regarding an expected page size which varies depending on the scan option being selected by the user. The expected page size information may indicate the page size of the current page based on the scanning being performed with the selected scan option for the image processing of the page. For example, if the user selects to change the color/monochrome mode, among other scan options, from color to monochrome, the expected page size may appear in the indication 250 as being changed from 500 KB to 400 KB.

The user may select the icon 230 to check another page, e.g., the second page, of the scanned document, and the interface 200 may represent the second page on the preview image 220. For the second page, the user may make, for example, an adjustment as described above.

As such, if the scan job is complete with the page-specific adjustments made by the user to the respective pages of the document, resultant image data may be generated from image processing of those page based on the scan options selected therefor. As discussed, the user may use the page size adjustment option or directly adjust some of the given scan options to make a page-specific adjustment to change a page size of a particular page of the scanned document to his/her desired page size. Accordingly, the user may achieve both desired file size and quality of the image data regarding the scanned document, as eventually stored, and thus may have enhanced user experience in the scanning. For example, it may be assumed that the user is scanning a document including a plurality of pages, where a high image quality is used for a word-packed one of the pages while a relatively low image quality is allowed for a mostly picture-filled one of the pages. An example method may assist the user in checking each of the pages of the scanned document to reduce the page size of the mostly picture-filled page to a value in a desired range, thereby delivering a desired quality of the scanned document into a file while decreasing the size of the entire file.

FIG. 3 illustrates an interface for a page-specific adjustment according to an example.

Referring to FIG. 3, an interface 300 includes scan options 310, a preview image 320 of a page of a scanned document, an icon 330 with which to check another page of the scanned document, a page size adjustment option 340 with which to adjust a page size of the currently presented page, and an indication 350 of, e.g., page size information regarding the current page. The interface 300 further includes an indication 360 by which the user may be provided information on an option(s) to be changed.

In the illustrated example, in order that a page size of a first page of the document is changed to a selected page size, the color/monochrome mode, among other scan options, may be changed from color to monochrome. For example, the scan option to be changed may be presented on the indication 350 of the interface with the information thereof provided on the indication 360. The indication 360 may include a message such as: "The mode will switch to the monochrome mode for operation with your selected file size." Thus, the user may be informed of a change that may be made to a scan option in order to achieve his/her desired page size.

FIG. 4 illustrates an interface for a page-specific adjustment according to an example.

Referring to FIG. 4, an interface 400 includes scan options 410, a preview image 420 of a page of a scanned document, an icon 430 with which to check another page of the scanned document, a page size adjustment option 440 with which to adjust a page size of the currently presented page, and an indication 450 of, e.g., page size information regarding the current page.

In the illustrated example, the interface 400 further provides, for a particular page of the multi-page document, a menu 460 on which its storage format is selectable from among the scan options. In this way, the storage format for the particular page of the document may be specified to be different from that for another page of the document. Thus, the document may be scanned and stored into two or more files. It may be assumed as an example that a document includes a first page, a second page, and a third page and the document is scanned into first image data for which a certain storage format is available. In such case, in a manner different from or in addition to the above-mentioned page size adjustments to the first and the second pages, a different storage format may be selected for the third page from among the scan options provided therefor. In other words, these two storage formats, the former one for both the first and the second pages and the latter one for the third page, are different from each other. While the first and the second pages are processed with the page size adjustments into second image data, the third page may be separately stored as third image data. For example, if according to the default scan options of the image forming apparatus, a scan image is set to be saved as a JPG file, the first image data, i.e., the image data into which the first to the third pages are initially scanned, is set to have a JPG format. If, among other scan options for the third page, the storage format is selected as a non-JPG format, for example, to be of PDF type, the selected scan option and its corresponding page size information may be presented on the indication 450 of the interface. If the scan job is complete with the page-specific adjustment, the second image data is generated as a JPG formatted file into which the first and the second pages are incorporated, whereas the third image data is created in a PDF format. The example scanning method may provide a page-specific adjustment function to store two or more differently formatted files during a single scan job, thereby avoiding any inconvenience that would otherwise be caused by multiple scan jobs and thus leading to improved user experience.

Figure 5:
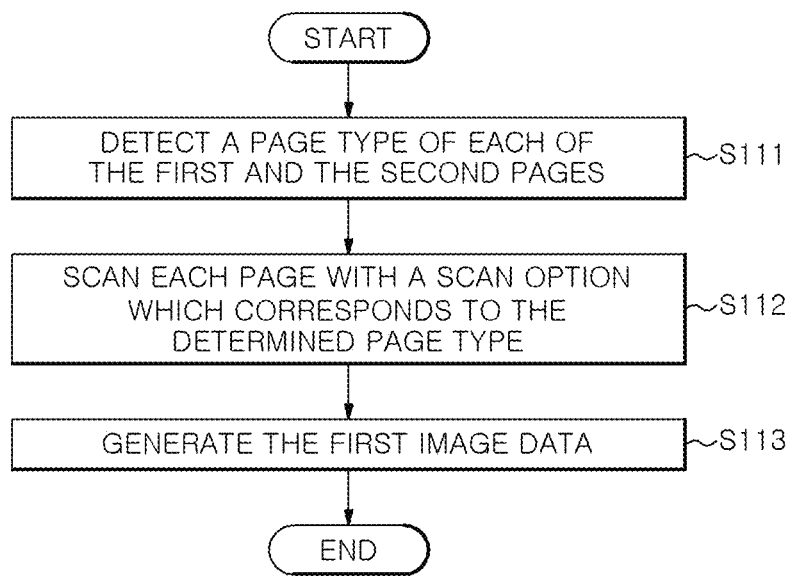
FIG. 5 is a flow diagram illustrating page type-specific image processing involved in a scanning method according to an example.

FIG. 5 is a flow diagram illustrating page type-specific image processing involved in a scanning method according to an example. In the scanning method of this example, a scan option may be set per page type and used for scanning of a multi-page document to generate image data.

In this regard, at operation S110 in the example illustrated in FIG. 1 where the first image data is generated, the document to be scanned may include a mostly textual page, a mostly illustrated or pictorial page, or a text-with-illustration-picture page. Referring to FIG. 5, in order to perform the scanning, the image forming apparatus may detect a page type of each page of the document at operation S111. At operation S112, each page may be scanned with a corresponding scan option which is set according to its determined page type. At operation S113, from the respective scanning thereof, the first image data may be generated.

Figure 6:
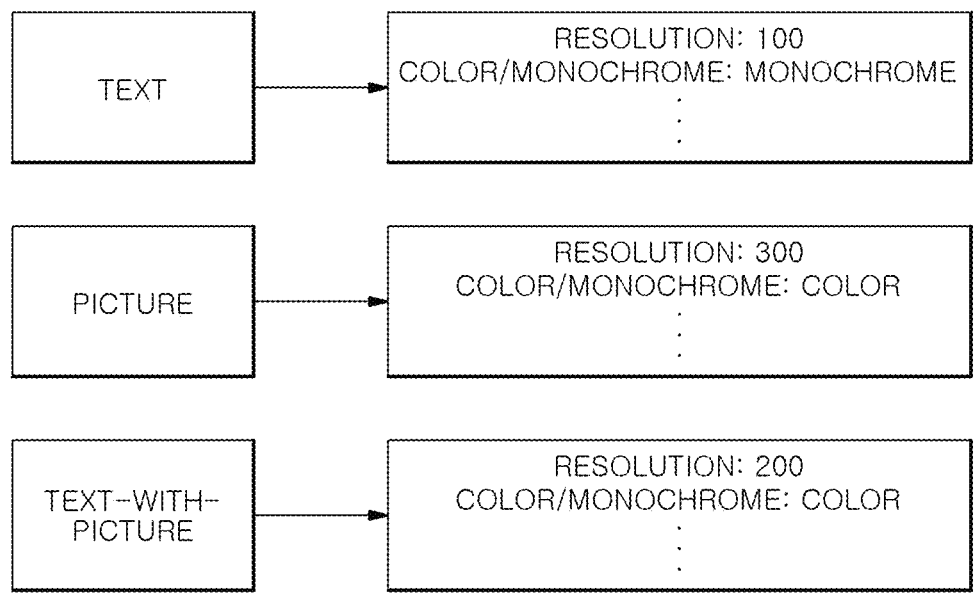
FIG. 6 is a diagram illustrating a page type-specific scan option according to an example.

FIG. 6 is a diagram illustrating a page type-specific scan option according to an example. Referring to FIG. 6, an example is illustrated in which, before carrying out a scan job, a user may provide settings such as: to scan a mostly textual page, use a 100 dpi resolution in a monochrome mode; to scan a mostly pictorial page, use a 300 dpi resolution in a color mode; and to scan a text-with-picture page, use a 200 dpi resolution in a color mode.

Referring again to the example method of FIG. 5, it is seen that the image forming apparatus may scan a document by detecting, at operation S111, a page type of each page of the scanned document, scanning, at operation S112, that page with a scan option which is set according to its page type, and generating, at operation S113, image data therefrom. Such per-page scan option may be set by the user prior to the scan job and may be adjusted by the user selecting a page type from among the scan options 210, 310, or 410 as discussed above with respect to FIGS. 2 to 4. As such, a single scan job may be provided by which different scan options are applicable to different pages so that a desired scan quality and file size may be achieved together.

As discussed above, various examples of the present disclosure allow for checking page size information for any particular page of a document and adjusting the page size information, and thus a certain scan option based on which to perform image processing to scan the page into a scan file, without the need of multiple scanning jobs. Accordingly, enhanced user experience may be provided along with both desired file size and quality of the image data regarding the scanned document.

Figure 7:
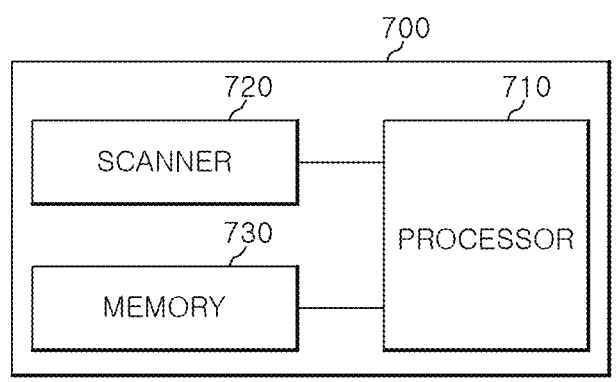
FIG. 7 is a block diagram conceptually illustrating an image forming apparatus according to an example.

FIG. 7 is a block diagram conceptually illustrating an image forming apparatus according to an example.

Referring to FIG. 7, an image forming apparatus 700 may include a processor 710, a scanner 720, and a memory 730. Other implementations are also contemplated. In an example, the image forming apparatus 700 may also include an additional component, e.g., a power supply unit to supply power to the above-mentioned components, a display unit, a user interface unit, a communications unit to communicate with other entities, or the like. In another example, the image forming apparatus 700 may include some of, but not all of, the components shown in FIG. 7. Further, the image forming apparatus 700 is not necessarily a single device but may include a plurality of interconnected devices.

In an example, the processor 710 may control an operation of the image forming apparatus 700. For example, the processor 710 may be implemented with a central processing unit (CPU), a graphics processing unit (GPU), or other processing circuitry to perform example operations as described herein. In an example, the processor 710 may execute an instruction stored in the memory 730. The processor 710 may also read information stored in the memory 730. In addition, the processor 710 may store new information in the memory 730 and may update information stored in the memory 730. For example, the processor 710 may obtain, from the memory 730, information used to control the image forming apparatus 700 or may store such information in the memory 730.

In an example, the scanner 720 may scan a document to generate image data. The scanner may include an image sensor or the like that is to acquire and transform imagery of the document to a digital signal to generate image data as a scan image.

In an example, the memory 730 may be implemented with Random Access Memory (RAM), Read-Only Memory (ROM), or any other type of storage medium that stores data. The memory 730 may have stored therein a variety of information, for example, a set of instructions that are to be executed by the processor 710.

In an example, the image forming apparatus 700 may include the processor 710 and the memory 730 having instructions stored therein which, based on execution by the processor 710, cause the processor 710 to operate the image forming apparatus 700 in a particular manner.

In an example, upon execution of the instructions, the image forming apparatus 700 is to generate first image data by scanning a document including a first page and a second page, provide a first scan option applicable to the first page along with first page size information corresponding to the first scan option and a second scan option applicable to the second page along with second page size information corresponding to the second scan option, and generate second image data by performing image processing based on the first scan option and the second scan option being respectively selected for the first page and the second page. For example, the image forming apparatus 700 may scan a document including a plurality of pages to generate image data, for example, the first image data, receive, from a user, a selection of a scan option and/or a page size adjustment option for each of the pages of the document, and scan each of the pages based thereon to generate a resultant file, for example, the second image data. For further examples of operations of providing the scan option and the page size information for each page, receiving the selection of the option, and performing the image processing based on the received selection, reference may be made to the description provided above with respect to FIGS. 2 to 6.

In an example, upon execution of the instructions, the image forming apparatus 700 is to provide preview image data regarding the first page and the second page, with the selected first scan option and the selected second scan option being respectively applied thereto. The preview image data may be provided to and presented on a display, if arranged in the image forming apparatus 700. Additionally or alternatively, the image forming apparatus 700 may provide the preview image data to another electronic device, such as the user's PC or mobile device, which is coupled to the image forming apparatus 700, in order that the preview image may be presented on the other electronic device.

In an example, upon execution of the instructions, the image forming apparatus 700 is to provide a first page size adjustment option with which to adjust the first page size information and a second page size adjustment option with which to adjust the second page size information.

In an example, upon execution of the instructions, the image forming apparatus 700 is to, in response to the user selecting the first and the second page size adjustment options, provide information regarding a scan option(s) with which the selected page size adjustment options are made available. Examples of the scan option include an image processing parameter, including at least one of an image quality, an image resolution, an image format, a color/monochrome mode, a storage file format, etc. The user may select the page size adjustment options through an input unit such as a touchscreen, an input button, or the like of the image forming apparatus 700, or through an input unit of another electronic device, such as the user's PC or mobile device, that is coupled to the image forming apparatus 700.

In an example, upon execution of the instructions, the image forming apparatus 700 is to provide a third scan option applicable to a third page of the document along with third page size information corresponding to the third scan option, and generate third image data by performing image processing based on the third scan option being selected for the third page. As discussed above with respect to FIG. 4, the image forming apparatus 700 may receive, from the user, an input to specify a storage format for a particular page, e.g., the third page, of the document as being different from that for another page, for example, the first and the second pages, of the document. In this example, where the document is scanned into the first image data, the first and the second pages are incorporated into the second image data, and the third page is incorporated into the third image data, the image forming apparatus 700 may generate, from the first image data, the second image data and the third image data, thereby producing two or more stored scan files in performing the scan jobs.

In an example, upon execution of the instructions, the image forming apparatus 700 is to detect a page type of each of the first and the second pages, and generate the first image data by scanning each of the first and the second pages with a preset scan option which corresponds to its respective determined page type. As such, as discussed above with respect to FIGS. 5 and 6, for each page of the multi-page document, the image forming apparatus 700 is to classify its page type as a certain type, for example, a text type, a picture type, or a text-with-picture type, for use in the scanning of the document. The image forming apparatus 700 may perform the scanning on each page according to the determined page type to generate scanned image data, for example, the first image data.

In an example, upon execution of the instructions, the image forming apparatus 700 is to, in response to receiving an input as to the first and the second scan options, change the first page size information and the second page size information and provide the same. Such information may be provided to and presented on a display, if arranged in the image forming apparatus 700. Additionally or alternatively, the image forming apparatus 700 may provide the preview image data to another electronic device, such as the user's PC or mobile device, which is coupled to the image forming apparatus 700, in order that the preview image may be presented on the other electronic device. Accordingly, the user may check the page size information for each page and then select his/her desired page size and scan option to carry out the scan job.

Figure 9:
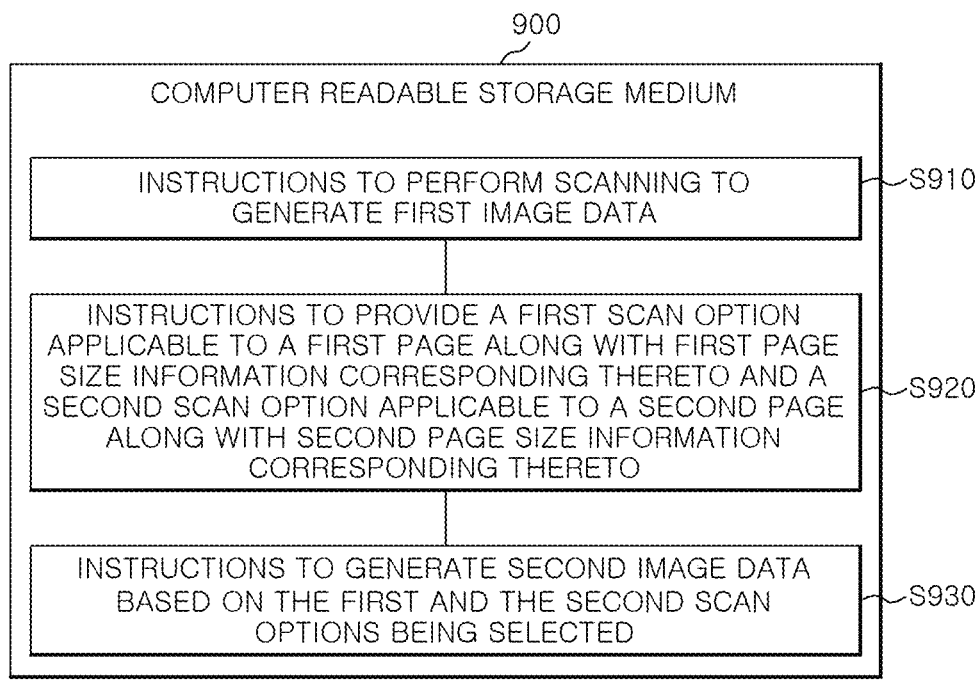
FIG. 9 illustrates a non-transitory computer readable storage medium including instructions stored thereon according to an example.

FIG. 9 illustrates a non-transitory computer readable storage medium including instructions stored thereon according to an example.

Referring to FIG. 9, a non-transitory computer readable storage medium 900 stores a computer program that is executable by a processor and programmable to implement operations of the aforementioned methodology, such as the method steps described above with respect to FIGS. 1 to 6 and the device operations described above with respect to FIG. 7.

The computer program on the non-transitory computer readable storage medium 900 may include a set of machine readable instructions that direct the processor to perform various operations. With reference to FIG. 9, an example of machine readable instructions stored in the non-transitory computer readable storage medium 900 will be described.

In an example, based on execution by a computer, such as the image forming apparatus 700, the machine readable instructions cause the computer to perform operations, including an operation S910 of generating first image data by scanning a document including a first page and a second page, an operation S920 of providing a first scan option applicable to the first page along with first page size information corresponding to the first scan option, and a second scan option applicable to the second page along with second page size information corresponding to the second scan option, and an operation S930 of generating second image data by performing image processing based on the first scan option and the second scan option being respectively selected for the first page and the second page.

For further information on the example operations S910, S920, and S930, as well as the method steps described above with respect to FIGS. 1 to 6 and the device operations described above with respect to FIG. 7, reference may be made to the above description of the image forming apparatus 700.

The term "non-transitory readable medium" as used herein refers to a medium that is capable of semi-permanently storing data and is readable by an apparatus, rather than a medium, e.g., a register, a cache, a volatile memory device, etc., that temporarily stores data. For example, the foregoing program instructions may be stored and provided in a CD, a DVD, a hard disk, a Blu-ray disc, a USB, a memory card, a ROM device, or any of other type of non-transitory readable media.

In an example, the methodology disclosed herein may be incorporated into a computer program product. The computer program product may be available as a product for trading between a seller and a buyer. The computer program product may be distributed in the form of a machine-readable storage medium, e.g., compact disc read only memory (CD-ROM), or distributed online through an application store, e.g., PlayStore™. For online distribution, a portion of the computer program product may be temporarily stored, or temporarily created, in a storage medium such as a server of the manufacturer, a server of the application store, or a storage medium such as memory of a relay server.

The foregoing description has been presented to illustrate and describe various examples. It should be understood that many modifications and variations are possible in light of the above description. In various examples, suitable results may be achieved if the above-described techniques are performed in a different order, and/or if some of the components of the above-described systems, architectures, devices, circuits, and the like are coupled or combined in a different manner, or substituted for or replaced by other components or equivalents thereof.

Although the foregoing examples are described in the context of image forming apparatuses, it should be understood that the present disclosure is not limited to such image forming apparatuses and is applicable in other situations where a policy is to be used for management of a plurality of user devices or electronic devices.

Therefore, the scope of the disclosure is not to be limited to the examples as disclosed, but rather defined by the following claims and equivalents thereof.

What is claimed is:

1. A non-transitory computer readable storage medium having stored therein a computer program that, based on execution by a computer, causes the computer to perform operations comprising:
   generating first image data by scanning a document comprising a first page and a second page;
   providing a plurality of scan options for each of a plurality of page types for the document;
   receiving a first scan option applicable to a first page type along with first page data size information corresponding to the first scan option, and a second scan option applicable to a second page type along with second page data size information corresponding to the second scan option, wherein the first scan option includes a first image processing parameter to be applied to the first page type and the second scan option includes a second image processing parameter to be applied to the second page type;
   determining that the first page is the first page type and the second page is the second page type; and
   generating second image data by performing image processing based on the first scan option and the second scan option being respectively determined for the first page and the second page.

2. The computer readable storage medium of claim 1, wherein the operations further comprise providing, with the determined first scan option and the determined second scan option respectively applied to the first page and the second page, preview image data regarding the first page and the second page.

3. The computer readable storage medium of claim 1, wherein the operations further comprise providing a first page size option with which to adjust the first page data size information and a second page size option with which to adjust the second page data size information, and wherein each of the first and the second page size options is to adjust, within a range of a minimum to a maximum page size of a respective one of the first and the second pages, a page size of the respective page.

4. The computer readable storage medium of claim 3, wherein each of the first and the second scan options comprises an image processing parameter, wherein the image processing parameter comprises at least one of an image quality, an image resolution, an image format, a color/monochrome mode, or a storage file format, and wherein the operations further comprise providing, based on the first and the second page options being selected, information regarding a change of the image processing parameter of each of the first and the second scan options.

5. The computer readable storage medium of claim 1, wherein the document further comprises a third page, and wherein the operations further comprise:
   providing a third scan option applicable to the third page along with third page data size information corresponding to the third scan option; and
   generating third image data by performing image processing based on the third scan option being selected for the third page.

6. The computer readable storage medium of claim 1, wherein the generating of the first image data comprises:
   determining a page type of each of the first and the second pages; and
   generating the first image data by scanning each of the first and the second pages with a preset scan option which corresponds to the determined page type, wherein the page type comprises at least one of a text type, a picture type, or a text-with-picture type.

7. The computer readable storage medium of claim 1, wherein the providing of the first scan option, the first page data size information, the second scan option, and the second page data size information comprises:
   in response to receiving an input as to the first scan option and the second scan option, changing the first page data size information and the second page data size information and providing the changed first page data size information and the changed second page data size information.

8. The computer readable storage medium of claim 1, wherein the first page type and the second page type are determined based on the first image data of the document comprising the first page and the second page.

9. The computer readable storage medium of claim 1, wherein the first image data is raw image data.

10. The computer readable storage medium of claim 1, wherein the second scan option includes an image processing parameter to be applied to the second page type.

11. The computer readable storage medium of claim 1, further comprising the computer to perform operations comprising: displaying a preview image of the first page with the page data size information and applied scan options of the first page type on a user interface in response to determining the first page is the first page type.

12. An image forming apparatus, comprising:
a processor;
a scanner; and
a memory having stored therein instructions that, based on being executed, cause the processor to perform operations comprising:
generating first image data by scanning a document comprising a first page and a second page;
providing a plurality of scan options for each of a plurality of page types for the document;
receiving a first scan option applicable to a first page type along with first page data size information corresponding to the first scan option, and a second scan option applicable to a second page type along with second page data size information corresponding to the second scan option, wherein the first scan option includes a first image processing parameter to be applied to the first page type and the second scan option includes a second image processing parameter to be applied to the second page type;
determining that the first page is the first page type and the second page is the second page type; and
generating second image data by performing image processing based on the first scan option and the second scan option being respectively determined for the first page and the second page.

13. The image forming apparatus of claim 12, wherein the operations further comprise providing, with the determined first scan option and the determined second scan option respectively applied to the first page and the second page, preview image data regarding the first page and the second page.

14. The image forming apparatus of claim 12, wherein the operations further comprise providing a first page size option with which to adjust the first page data size information and a second page size option with which to adjust the second page data size information, and wherein each of the first and the second page size options is to adjust, within a range of a minimum to a maximum page size of a respective one of the first and the second pages, a page size of the respective page.

15. The image forming apparatus of claim 14, wherein each of the first and the second scan options comprises an image processing parameter, wherein the image processing parameter comprises at least one of an image quality, an image resolution, an image format, a color/monochrome mode, or a storage file format, and wherein the operations further comprise providing, based on the first and the second page options being selected, information regarding a change of the image processing parameter of each of the first and the second scan options.

16. The image forming apparatus of claim 12, wherein the document further comprises a third page, and wherein the operations further comprise:
providing a third scan option applicable to the third page along with third page data size information corresponding to the third scan option; and
generating third image data by performing image processing based on the third scan option being selected for the third page.

17. The image forming apparatus of claim 12, wherein the generating of the first image data comprises:
determining a page type of each of the first and the second pages; and
generating the first image data by scanning each of the first and the second pages with a preset scan option which corresponds to the determined page type, wherein the page type comprises at least one of a text type, a picture type, or a text-with-picture type.

18. The image forming apparatus of claim 12, wherein the providing of the first scan option, the first page data size information, the second scan option, and the second page data size information comprises:
in response to receiving an input as to the first scan option and the second scan option, changing the first page data size information and the second page data size information and providing the changed first page data size information and the changed second page data size information.

19. A method for performing a scan job, comprising:
generating first image data by scanning a document comprising a first page and a second page;
providing a plurality of scan options for each of a plurality of page types for the document;
receiving a first scan option applicable to a first page type along with first page data size information corresponding to the first scan option and a second scan option applicable to a second page type along with second page data size information corresponding to the second scan option, wherein the first scan option includes a first image processing parameter to be applied to the first page type and the second scan option includes a second image processing parameter to be applied to the second page type;
determining that the first page is the first page type and the second page is the second page type; and
generating second image data by performing image processing based on the first scan option and the second scan option being respectively determined for the first page and the second page.

* * * * *